(12) United States Patent
Pipilis et al.

(10) Patent No.: US 9,115,775 B2
(45) Date of Patent: Aug. 25, 2015

(54) INTERNALLY VENTILATED BRAKE DISK ROTOR

(71) Applicant: BREMBO SGL CARBON CERAMIC BRAKES GMBH, Meitingen (DE)

(72) Inventors: Andreas Pipilis, Augsburg (DE); Christian Wittke, Neuburg A.D. Donau (DE); Alexander Klingelhoefer, Ehingen (DE); Yannick Willemin, Meitingen (DE)

(73) Assignee: Brembo SGL Carbon Ceramic Brakes GmbH, Meitingen (DE)

( * ) Notice: Subject to any disclaimer, the term of this patent is extended or adjusted under 35 U.S.C. 154(b) by 80 days.

(21) Appl. No.: 13/924,951

(22) Filed: Jun. 24, 2013

(65) Prior Publication Data

US 2013/0284547 A1    Oct. 31, 2013

Related U.S. Application Data

(63) Continuation of application No. PCT/EP2011/073956, filed on Dec. 23, 2011.

(30) Foreign Application Priority Data

Dec. 23, 2010 (EP) .................................. 10196953

(51) Int. Cl.
F16D 65/12 (2006.01)
F16D 65/02 (2006.01)

(52) U.S. Cl.
CPC ...... *F16D 65/128* (2013.01); *F16D 2065/1328* (2013.01)

(58) Field of Classification Search
USPC .................. 188/218 XL, 264 A, 264 AA
See application file for complete search history.

(56) References Cited

U.S. PATENT DOCUMENTS

| | | | | |
|---|---|---|---|---|
| 6,032,769 A * | 3/2000 | Daudi | ........................ | 188/218 R |
| 6,164,423 A * | 12/2000 | Dickerson | ............... | 188/218 XL |
| 7,032,724 B1 | 4/2006 | Hulten et al. | | |
| 7,066,306 B2 * | 6/2006 | Gavin | ..................... | 188/218 XL |
| 7,097,010 B1 * | 8/2006 | Hulten et al. | .......... | 188/264 AA |
| 7,100,748 B2 | 9/2006 | Prahst | | |
| 8,360,213 B2 | 1/2013 | Biondo et al. | | |
| 2004/0188196 A1 * | 9/2004 | Gavin | ..................... | 188/218 XL |

FOREIGN PATENT DOCUMENTS

| | | |
|---|---|---|
| CA | 2352714 A1 | 11/2002 |
| DE | 2257176 A1 | 5/1974 |
| GB | 1403828 A | 8/1975 |
| WO | 0127490 A1 | 4/2001 |
| WO | 0129442 A1 | 4/2001 |
| WO | 02090791 A1 | 11/2002 |
| WO | 2008135876 A2 | 11/2008 |

OTHER PUBLICATIONS

International Search Report of PCT/EP2011/073956, Dated July 20, 2012.

* cited by examiner

*Primary Examiner* — Christopher Schwartz
(74) *Attorney, Agent, or Firm* — Laurence A. Greenberg; Werner H. Stemer; Ralph E. Locher

(57) ABSTRACT

Internally vented brake disk rotors have a form of a cylindrical slab with an annular geometry and have an axis of circular symmetry for its outer circumference and its inner circumference and a center hole which is symmetric with regard to the axis. The brake disk contains at least two parallel ring disks which are connected with each other by a repeating series of ribs, the configuration of the brake disk rotor is symmetric with regard to different sense of rotation of the brake disk, i.e. symmetric to at least one plane spanned by the axis of rotation of the brake disk and one radius of the cylindrical brake disk.

11 Claims, 4 Drawing Sheets

INTERNALLY VENTILATED BRAKE DISK ROTOR

CROSS-REFERENCE TO RELATED APPLICATION

This is a continuation application, under 35 U.S.C. §120, of copending international application No. PCT/EP2011/073956, filed Dec. 23, 2011, which designated the United States; this application also claims the priority, under 35 U.S.C. §119, of European patent application No. EP 10 196 953.3, filed Dec. 23, 2010; the prior applications are herewith incorporated by reference in their entireties.

BACKGROUND OF THE INVENTION

Field of the Invention

The invention relates to an internally ventilated brake disk rotor having the form of a cylindrical slab of annular geometry and having an axis of circular symmetry for its outer circumference and its inner circumference, with a center hole which is symmetric with regard to the axis. The rotor has at least two disks which are aligned parallel to each other, and are connected with each other by a repeating series of ribs.

Internally ventilated brake disks have been known, i.e. from published, non-prosecuted German patent application DE 22 57 176 A1, and from U.S. Pat. No. 7,100,748 B2. These latter have two ring disks, or friction rings, which are connected to each other by webs or ribs, and ducts formed between the webs or ribs which ducts conduct cooling air. The ribs extend in a curved manner between their end regions, those at the outer circumference being radially aligned with respect to the brake disk, and the end regions neighboring the inner circumference being set in an angle of from 20° to 70° with respect to a tangent with respect to a circle touching the innermost point of the rib or web. The opening of the duct defined thereby points against the direction of rotation of the brake disk.

Although the design of cooling channels and ribs according to the U.S. Pat. No. 7,100,748 B2 leads to improved heat removal compared to published, non-prosecuted German patent application DE 22 57 176 A1, it was still desired to find a further improvement, particularly with regard to temperature homogeneity of the brake disk surface. Another shortcoming of the design according to U.S. Pat. No. 7,100,748 B2, and also of the co-pending EP patent application EP 10 160 307.4 is that it is not symmetrical with respect to the direction of rotation. Therefore different brake disks are needed for the right and left wheels of a motorcar or other vehicle. Symmetrical designs with respect to the sense of rotation have been known from international patent disclosure WO 2001/027 490 A1 (corresponding to U.S. Pat. No. 7,097,010), and also from Canadian patent application CA 2 352 714 A1 (corresponding to U.S. Pat. No. 7,066,306). The former has both inlets and outlets and ducts for the cooling air at or near the outer circumference of the brake disk, and thereby increase the mechanical strength of the central portion of the brake disk in the vicinity of the hub. This leads to an inhomogeneity of the temperature in the disk surface zone in the radial direction, and therefore, to inhomogeneity of thermal expansion, which gives rise to warping.

In Canadian patent application CA 2 352 714 A1, the distribution of fins, or pillars as they are referred to therein, is not homogeneous over the brake rotor surface. This leads to an inhomogeneous heat transfer, and subsequently, to temperature inhomogeneity which leads to warping of the brake disk rotor, due to differences in thermal expansion.

BRIEF SUMMARY OF THE INVENTION

It is therefore an object of the invention to provide an internally ventilated brake disk rotor which can be used both for the left and for the right hand side of a motorcar or other vehicle, which has efficient heat transfer, and also a homogeneous temperature distribution over the brake disk rotor surface.

Internally vented brake disk rotors are provided having the form of a cylindrical slab having an annular geometry and having an axis of circular symmetry for its outer circumference and its inner circumference, with a center hole which is symmetric with regard to the axis. The symmetry being that of a rotational symmetry group $C_i$, where i is the order of the rotational symmetry group $C_i$ selected from natural numbers and being at least 2. The brake disk contains at least two parallel ring disks which are connected with each other by a repeating series of ribs, the design of which brake disk rotor including the ribs is symmetric with regard to a different sense of rotation of the brake disk, i.e. symmetric to at least one plane spanned by the axis of rotation of the brake disk and one radius of the cylindrical brake disk. The at least two parallel ring disks and the ribs together form the brake disk rotor. The brake disk rotor has cooling ducts which are enclosed by at least two ribs. Ribs are massive pieces of material connecting the at least two parallel ring disks, which ribs may preferably be of the same material or of a similar material as the ring disks, and may preferably have a circular, elliptical, triangular, or oblong shape. At least 50% of the ribs must have an elliptical shape to achieve the favorable properties according to the present invention. "Elliptical", when used in the context of this invention, means having the shape of an ellipse in its mathematical sense, defined by two half-axes R1 and R2 where R1 is different from R2, and the length of the smaller of the two half-axes is not more than 90%, preferably, not more than 80%, and particularly preferred, not more than 75%, of the length of the larger of the two half-axes. A shape of a lozenge with rounded corners is, of course, not an ellipse. For the purpose of this invention, two materials are considered similar if they have a mass fraction of at least 20%, preferably at least 30%, and particularly preferred, of at least 40%, of the same chemical elements.

Preferably, the brake disk rotor contains at least two ribs $F_{j0}$, having a rounded triangular shape which are located adjacent to the inner circle of the annular brake disk, and at least four further ellipsoidal fin-shaped ribs $F_{jma}$ and $F_{jmb}$, wherein j is an element of the group of natural numbers $\{1; \ldots ; i\}$, and where i is the order of a rotational symmetry group $C_i$ selected from natural numbers and being at least 2, and m is a natural number of at least 1. For any fin-shaped rib $F_{jmb}$ or $F_{jma}$ having an end referred to as outer end which is closer to the outer circumference of the annular cylindrical slab forming the brake disk rotor than the other end, referred to as the inner end, of the same rib which accordingly is closer to the inner circumference of the brake disk rotor, a higher value of m means that at least one end, the outer end, or the inner end, is closer to the outer circumference than the corresponding outer or inner end of the fin with the lower value of m. Further, any pair of ribs $F_{jma}$ and $F_{jmb}$ for the same value of j and m are symmetrical to the plane spanned by the axis of symmetry which is identical to the axis of rotation, and the radius which goes through the center of the rib $F_{j0}$ having the same value of j. In a series of ribs $F_{jma}$ and $F_{jmb}$, having the same value of j and different values of m, the ribs having a higher value of m are located more towards the outer circumference of the brake disk rotor. Ribs $F_{jma}$ and $F_{jmb}$ for the same values of j and m are mirror images of each other with respect to a plane spanned by the axis of rotation which is identical to the axis of rotational symmetry, and the radius which connects all equivalent points of these two ribs. The brake disk rotor has a rotational symmetry obeying the symmetry group $C_i$.

Preferably, at least one of the following conditions is additionally fulfilled:

(a) i is an even number and is at least four, more preferred, at least six, and particularly preferred, at least eight, (b) m is at least two, more preferred, at least three, and further preferably, m is not more than six, (c) at least 50% of the ends of the cooling ducts towards the outer circumference of the brake disk enclose an angle with the radius through the center of the cooling duct of less 10°, (d) there is at least one rib $F_{j0}$ having a rounded triangular shape where one of the rounded corners points towards the outer circumference of the brake disk, and the side opposite to this corner of the rounded triangle is concave, (e) there is at least one rib $F_{j0}$ having a rounded triangular shape which is concave, in at least two of the three sides of the triangle, (f) any two elliptical ribs $E_1'$ and $E_2'$, the ratio of the long axis to the short axis of the elliptical rib $E_2'$ with a higher distance $R_2'$ of its center from the axis of rotation is equal to, or lower as, the ratio of the long axis to the short axis of the elliptical rib $E_1'$ with a smaller distance $R_1'$ of its center from the axis of rotation, (g) for any two elliptical ribs $E_1$ and $E_2$, the smaller angle $\alpha_1$ enclosed between the long axis of the elliptical rib $E_1$ and a radius $R_1$ from the axis of rotation to the center of the rib $E_1$ is larger than the smaller angle $\alpha_2$ enclosed between the long axis of the elliptical rib $E_2$ and a radius $R_2$ from the axis of rotation to the center of the rib $E_2$, if $R_1$ is smaller than $R_2$, (h) there is one rib $F_{jL}$ in each set of ribs having the same value of j, which is divided into two halves of mirror symmetry with respect to a plane spanned by the axis of rotational symmetry of the brake disk, and a radius of the brake disk which goes though the center of the rib $F_{jL}$.

The symbols used here are explained in the figures and the legend thereto, for specific values of j and m.

It is preferred that two or more of these conditions are fulfilled in the same brake disk.

Particularly good results for heat transfer are obtained when two or more of the preferred embodiments are combined in one complex geometry, two or more meaning any combination of two out of conditions (a) to (g), viz., (a)+(b), (a)+(c), (a)+(d), (a)+(e), (a)+(f), (a)+(g) and (a)+(h); (b)+(c), (b)+(d), (b)+(e), (b)+(f), (b)+(g), and (b)+(h), (c)+(d), (c)+(e), (c)+(f), (c)+(g), and (c)+(h), (d)+(e), (d)+(f), (d)+(g), and (d)+(h), (e)+(f), (e)+(g), and (e)+(h), (f)+(g), and (f)+(h), and (g)+(h), and any combination of three out of (a) to (g), viz. (a)+(b)+(c), (a)+(b)+(d), (a)+(b)+(e), (a)+(b)+(f), (a)+(b)+(g), and (a)+(b)+(h), etc., and any combination of four out of (a) to (h), viz., (a)+(b)+(c)+(d), (a)+(b)+(c)+(e), (a)+(b)+(c)+(f), (a)+(b)+(c)+(g), and (a)+(b)+(c)+(h), etc., any combination of five out of (a) to (h), viz., (a)+(b)+(c)+(d)+(e), (a)+(b)+(c)+(d)+(f), (a)+(c)+(d)+(e)+(f), (a)+(b)+(d)+(e)+(f), (a)+(b)+(c)+(e)+(f), (a)+(b)+(c)+(d)+(f), and (b)+(c)+(d)+(e)+(f), etc., and any combination of six out of (a) to (h), viz., (a)+(b)+(c)+(d)+(e)+(f), (a)+(b)+(c)+(d)+(e)+(g), (a)+(b)+(c)+(d)+(f)+(g), (a)+(b)+(c)+(e)+(f)+(g), etc., until the combination of all eight additional conditions which is (a)+(b)+(c)+(d)+(e)+(f)+(g)+(h).

Other features which are considered as characteristic for the invention are set forth in the appended claims.

Although the invention is illustrated and described herein as embodied in an internally ventilated brake disk rotor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE INVENTION

Figure 1:
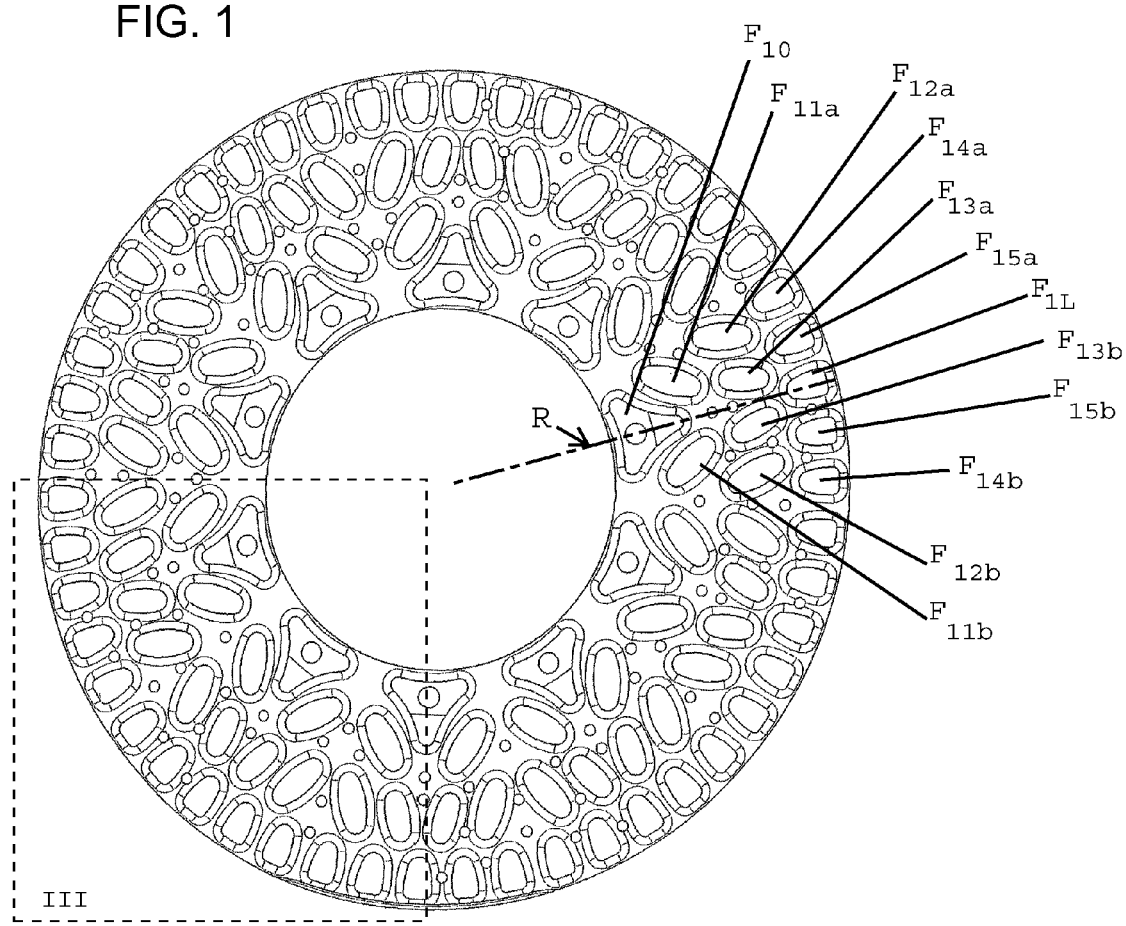
FIG. 1 is a diagrammatic, sectional view of a brake disk rotor according the invention.

Referring now to the figures of the drawings in detail and first, particularly to FIG. 1 thereof, there is shown a view onto a brake disk rotor having ten series of ribs, where all ribs having the same primary index j (here, j ranges from 1 to 10) and a secondary index m (here m ranges from 1 to 5) are each mirror symmetric with respect to the other ribs having the same primary and secondary index, and are distinguished by a third index which assumes the values "a" (all the ribs $F_{1ma}$ for m ranging from 1 to 5 are shown with names in FIG. 1) and "b". Additionally, there are two ribs lying on the radius R, $F_{10}$, and $F_{1L}$.

Figure 2:
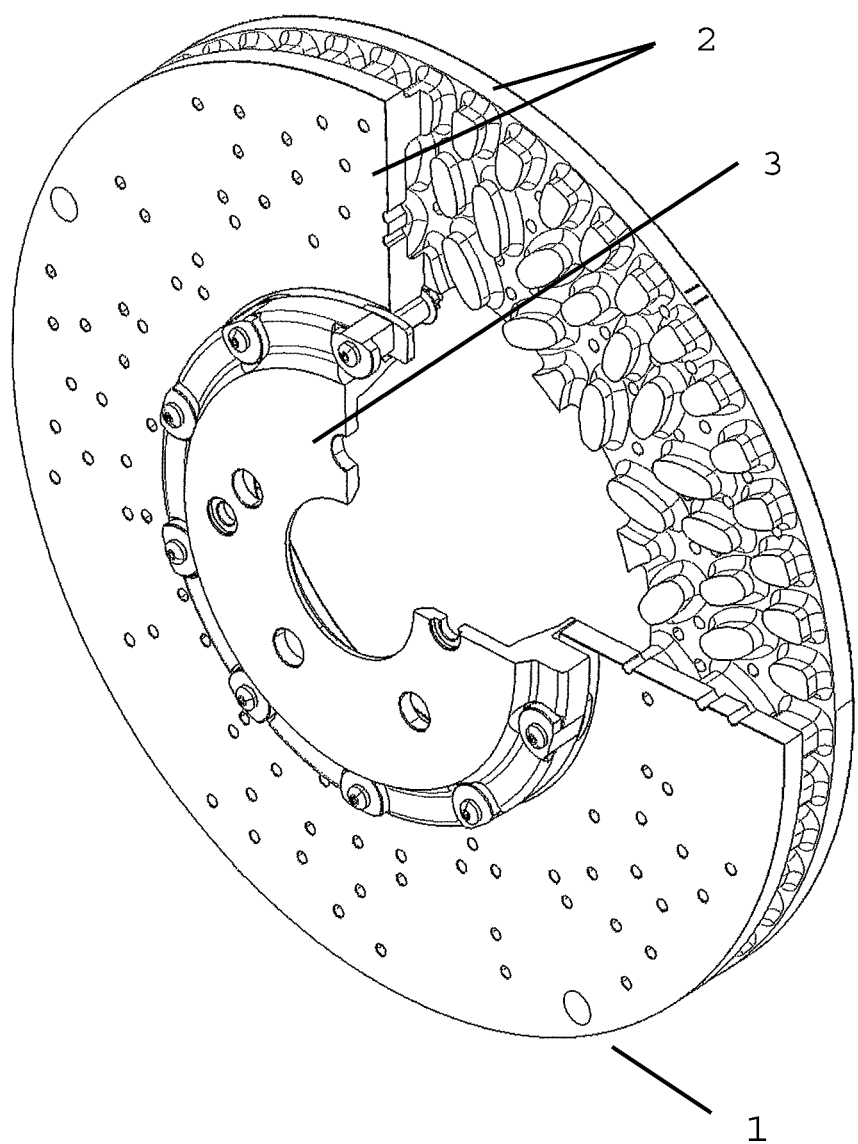
FIG. 2 is a diagrammatic, partially cut-away, perspective view of the brake disk rotor.

FIG. 2 is a perspective view onto the same brake disk rotor 1 where one quarter of one of the ring disks 2 connected by the ribs has been removed so that the geometry of the ribs can be clearly seen. A hub or bell 3 is shown which is connected to the brake disk rotor 1 by nuts and bolts.

Figure 3:
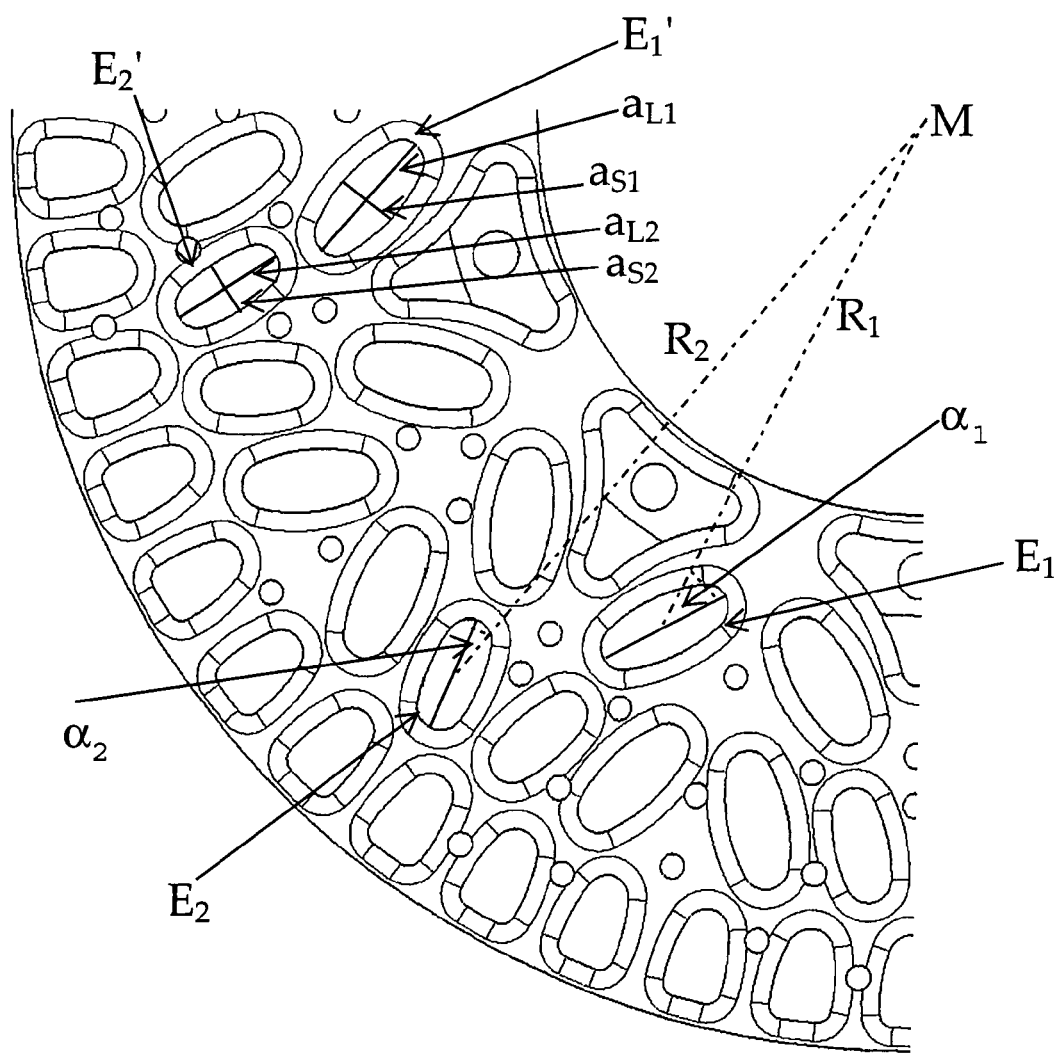
FIG. 3 is a diagrammatic, sectional view of a part of the brake disk rotor.

FIG. 3 shows a section of FIG. 1 where the following of the preferred conditions are fulfilled:

(a) i is 10, and therefore, an even number and is at least four, more preferred, at least six, and particularly preferred, at least eight, (b) m is 5, and therefore at least two, and also, at least three, and further, m is not more than six, (c) all cooling ducts, which are at least 50% of the ends of the cooling ducts, towards the outer circumference of the brake disk enclose an angle with the radius through the center of the cooling duct of less 10°, (d) in each series of ribs with the same value of j, there is one rib $F_{j0}$ having a rounded triangular shape where one of the rounded corners points towards the outer circumference of the brake disk, and the side opposite to this corner of the rounded triangle is concave, (e) in each series of ribs with the same value of j, there is one rib $F_{j0}$ having a rounded triangular shape which is concave, in at least two of the three sides of the triangle, (f) for any two elliptical ribs $E_1'$ and $E_2'$, the ratio of the long axis to the short axis of the elliptical rib $E_2'$ with a higher distance $R_2'$ of its center from the axis of rotation is equal to, or lower as, the ratio of the long axis to the short axis of the elliptical rib $E_1'$ with a smaller distance $R_1'$ of its center from the axis of rotation, (g) for any two elliptical ribs $E_1$ and $E_2$, the smaller angle $\alpha_1$ enclosed between the long axis of the elliptical rib $E_1$ and a radius $R_1$ from the axis of rotation to the center of the rib $E_1$ is larger than the smaller angle $\alpha_2$ enclosed between the long axis of the elliptical rib $E_2$ and a radius $R_2$ from the axis of rotation to the center of the rib $E_2$, if $R_1$ is smaller than $R_2$, (h) there is one rib $F_{jL}$ in each set of ribs having the same value of j, which is divided into two halves of mirror symmetry with respect to a plane spanned by the axis of rotational symmetry of the brake disk, and a radius of the brake disk which goes though the center of the rib $F_{jL}$.

For the sake of better visibility, $R_1'$ and $R_2'$ are not shown in FIG. 3. They are the distances from the centers of the elliptical ribs $E_1'$ and $E_2'$ to the center of symmetry M which is identical to the intersection of the axis of rotation and the plane of the drawing, and which is the intersection of $R_1$ and $R_2$ as shown in FIG. 3.

Figure 4A:
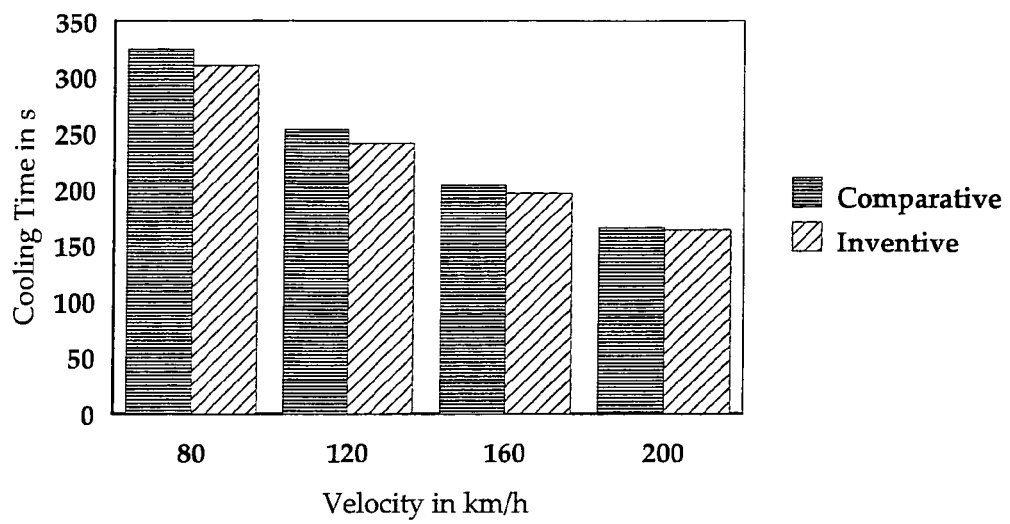
FIG. 4A is a graph showing cooling times.
Figure 4B:
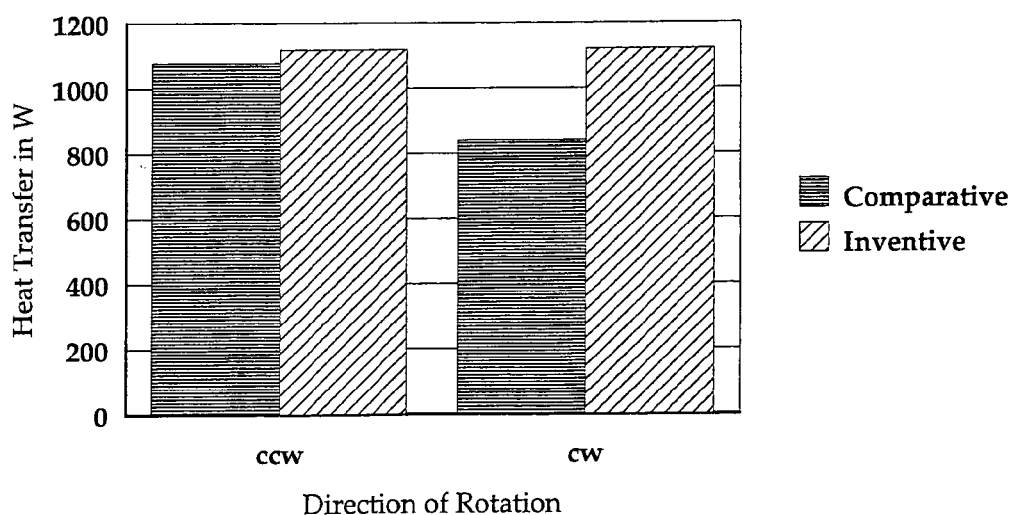
FIG. 4B is a graph showing a heat transfer efficiency.

FIGS. 4A and 4B show a comparison of the cooling time (FIG. 4A) and heat transfer (FIG. 4B) of a brake disk rotor with the same dimensions (diameters of inner and outer ring of the cylinder ring) which has been optimized for rotation in one direction ("Comparative"), and a brake disk rotor according to the present invention ("Inventive"), as explained in detail in the section for examples.

The improvement in heat transfer efficiency is shown in the following experiments, using brake disk rotors made of a ceramic composite material, viz. silicon carbide reinforced with carbon fibers. The same improvements in heat transfer efficiency can be realized using conventional brake disk rotors made from grey cast iron.

Example 1

An experiment has been made to distinguish between a design according to the invention as represented by FIG. 1, and the design as described in the co-pending European patent application EP 10 160 307.4, to show the increase in performance of a brake disk rotor according to the present invention in comparison to the state of the art independent of sense of rotation. In both cases, the material of the vented brake disks was the same carbon-fiber reinforced silicon carbide ceramic material, with a height of the cooling channels of 20 mm, a total thickness of 40 mm, an outer diameter of 400 mm, and an inner diameter of 200 mm. Both designs were optimized for good uniformity of the heat transfer over the surface of the brake disk rotor which leads to homogeneous temperature distribution over the friction surface area of a brake disk, and thereby, also to a decrease in thermally induced tensions within the brake disk.

Brake disks with a cooling channel and rib design according to FIG. 1 of European patent application EP 10 160 307.4 ("Comparative"), and according to FIG. 1 of this invention ("Inventive") were fixed in consecutive runs to the same motorcar, brought by braking to a initial temperature measured on the surface of 500° C., where after the brake was released, and the vehicle then driven in four different sets of measurements at a constant velocity of 80 km/h, 120 km/h, 160 km/h, and 200 km/h, with recordation of the time needed until the temperature on the brake disk surface, measured always at the same location with respect to the brake caliper, had dropped to 150° C.

The following cooling times were recorded:

| Brake Disk | 80 km/h | 120 km/h | 160 km/h | 200 km/h |
|---|---|---|---|---|
| Comparative | 325 s | 253 s | 203 s | 165 s |
| Inventive | 310 s | 241 s | 196 s | 163 s |

It can be seen that within the experimental error, the cooling performance of the brake disk according to the invention is about the same as that of the comparative brake disk (EP 10 160 307.4), although the results were always slightly better for the brake disk with the cooling channel and rib design according to the invention.

Example 2

In another experiment, the heat transfer from the heated brake disk to cooling air in different directions of rotation was assessed. The same brake disks as in Example 1 at the same initial temperature of 500° C. were used, and the heat transfer was assessed from the cooling air temperatures before and after passage through the cooling ducts, and mass fluxes of the cooling air.

The following data were found (sense of rotation: ccw=counterclockwise, cw=clockwise):

| Brake Disk Rotor | Comp., cw | Comp. Ccw | Inv., ccw | Inv., cw |
|---|---|---|---|---|
| Heat Transfer in W | 1075 | 839 | 1118 | 1120 |
| Relative Performance in % | 100 | 78 | 104 | 104 |

As can be seen, operation of the brake disk rotor "Comp." ("Comparative") in the wrong sense lowers the heat transfer efficiency markedly, by 22% of the heat transfer which can be achieved rotating this disk in the correct sense of rotation. A brake disk according to the invention "Inv." ("Inventive") has a slightly increased efficiency of heat transfer (+4%) compared with rotating the disk rotor "Comp" in the intended direction. The efficiency of heat transfer for the brake disk rotor according to this invention is independent on the sense of rotation, as the results for counterclockwise and clockwise rotation are the same, within experimental error.

The invention claimed is:

1. Internally vented brake disk, comprising:
    a disk body having a form of a cylindrical slab with an annular geometry and with an axis of circular symmetry for an outer circumference and an inner circumference, said disk body having a center hole formed therein and being symmetric with regard to said axis, said symmetry being that of a rotational symmetry group $C_i$, where i is an order of the rotational symmetry group $C_i$ selected from natural numbers and being at least 2, said disk body further having at least two parallel ring disks which are connected with each other by a repeating series of ribs, said disk body being symmetric with regard to different sense of rotation of the brake disk, and at least 50% of said ribs having an elliptical shape;
    at least two of said ribs $F_{j0}$ have a rounded triangular shape and disposed adjacent to an inner circle of said disk body, and at least four of said ribs are further fin-shaped ribs $F_{jma}$ and $F_{jmb}$ wherein is an element of a group of natural numbers $\{1; \ldots, i\}$, and where i is the order of the rotational symmetry group $C_i$ selected from natural numbers and being at least 2, and m is a natural number of at least 1; and wherein at least one of the following additional conditions is fulfilled:

i is an even number and is at least four;

m is at least two;

said ribs defining cooling ducts and at least 50% of ends of said cooling ducts towards the outer circumference of said disk body enclose an angle with a radius through a center of said cooling duct of less than 10°;

at least one of said ribs $F_{jO}$ having said rounded triangular shape with one rounded corner pointing towards said outer circumference of said disk body, and a side opposite to said rounded corner of said rounded triangle is concave;

at least one of said ribs $F_{jO}$ having said rounded triangular shape and is concave, in at least two of three sides of said rounded triangular shape;

for any two of said ribs having said elliptical shape being elliptical ribs $E_1'$ and $E_2'$ a ratio of a long axis to a short axis of said elliptical rib $E_2'$ with a higher distance $R_2'$ of a center from an axis of rotation is equal to, or lower as, a ratio of the long axis to the short axis of said elliptical rib $E_1'$ with a smaller distance $R_1'$ of its center from the axis of rotation;

for any two of said ribs having said elliptical shape being elliptical ribs $E_1$ and $E_2$ a smaller angle α1 enclosed between the long axis of said elliptical rib $E_1$ and a radius $R_1$ from the axis of rotation to said center of said elliptical rib $E_1$ is larger than a smaller angle α2 enclosed between the long axis of said elliptical rib $E_2$ and a radius $R_2$ from the axis of rotation to the center of the said elliptical rib $E_2$, if $R_1$ is smaller than $R_2$; or there is one said rib $F_{jL}$ in each set of said ribs having a same value of j, which is divided into two halves of mirror symmetry with respect to a plane spanned by an axis of rotational symmetry of said disk body, and a radius of said disk body which goes though said center of said rib $F_{jL}$.

2. The internally ventilated brake disk according to claim 1, wherein i is at least six, and m is at least four.

3. The internally ventilated brake disk according to claim 1, wherein at least 50% of said ends of said cooling ducts towards said outer circumference of said disk body enclose an angle with the radius through the center of said cooling duct of less 10°.

4. The internally ventilated brake disk according to claim 1, wherein at least one of said ribs $F_{jO}$ having said rounded triangular shape with one rounded corner pointing towards said outer circumference of said disk body, and a side opposite to said rounded corner of said rounded triangle is concave.

5. The internally ventilated brake disk according to claim 1, wherein for any two of said elliptical ribs, a ratio of the long axis to the short axis of said elliptical rib with a higher distance of said center from the axis of rotation is equal to, or lower as, the ratio of the long axis to the short axis of said elliptical rib with a smaller distance of said center from the axis of rotation.

6. The internally ventilated brake disk according to claim 1, wherein at least one of said ribs $F_{jO}$, having said rounded triangular shape which is concave, in at least two of the three sides of said rounded triangular shape, j being an element of a group of natural numbers $\{1; \ldots, i\}$, and i is the order of the rotational symmetry group $C_i$ which is the same as a symmetry of said disk body, selected from natural numbers and being at least 2.

7. The internally ventilated brake disk according to claim 1, wherein at least one of said ribs $F_{jL}$ in each set of said ribs having a same value of j, which is divided into two halves of mirror symmetry with respect to a plane spanned by the axis of rotational symmetry of said disk body, and a radius of said disk body which goes through the center of the said rib $F_{jL}$.

8. The internally ventilated brake disk according to claim 1, wherein said ribs having said elliptical shape are elliptical ribs and for any two of said elliptical ribs $E_1$ and $E_2$, a smaller angle $α_1$ enclosed between a long axis of said elliptical rib $E_1$ and a radius $R_1$ from an axis of rotation to a center of said elliptical rib $E_1$ is larger than a smaller angle $α_2$ enclosed between a long axis of said elliptical rib $E_2$ and a radius $R_2$ from the axis of rotation to a center of said elliptical rib $E_2$, if $R_1$ is smaller than $R_2$.

9. The internally ventilated brake disk according to claim 1, wherein said disk body is symmetric with regard to at least one plane spanned by an axis of rotation of the brake disk and one radius of the brake disk.

10. The internally ventilated brake disk according to claim 1, wherein i is at least six and m is at least three.

11. The internally ventilated brake disk according to claim 1, wherein i is at least eight and M is not more than six.

* * * * *